United States Patent
Konishi et al.

(10) Patent No.: US 9,517,954 B2
(45) Date of Patent: Dec. 13, 2016

(54) CHEMICAL INJECTION CONTROL METHOD AND CHEMICAL INJECTION CONTROLLER

(71) Applicant: ASAHI KASEI CHEMICALS CORPORATION, Tokyo (JP)

(72) Inventors: Takahiro Konishi, Tokyo (JP); Shinji Okubo, Tokyo (JP); Kei Hattori, Tokyo (JP); Yutaka Gojo, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 411 days.

(21) Appl. No.: 14/353,852

(22) PCT Filed: Oct. 24, 2012

(86) PCT No.: PCT/JP2012/077473
§ 371 (c)(1),
(2) Date: Apr. 24, 2014

(87) PCT Pub. No.: WO2013/062003
PCT Pub. Date: May 2, 2013

(65) Prior Publication Data
US 2014/0277746 A1    Sep. 18, 2014

(30) Foreign Application Priority Data
Oct. 28, 2011    (JP) .................. 2011-236741

(51) Int. Cl.
*G05B 19/00* (2006.01)
*C02F 1/52* (2006.01)
(Continued)

(52) U.S. Cl.
CPC .................. *C02F 1/52* (2013.01); *C02F 1/008* (2013.01); *C02F 1/5209* (2013.01); *C02F 1/004* (2013.01);
(Continued)

(58) Field of Classification Search
CPC .......... B01D 61/022; B01F 1/00; E21B 37/06; G05D 21/02; C02F 9/00; F17D 3/10
See application file for complete search history.

(56) References Cited

U.S. PATENT DOCUMENTS 5,353,237 A * 10/1994 Bass ................... G05D 21/02
700/272
6,408,227 B1    6/2002 Singhvi et al.
(Continued)

FOREIGN PATENT DOCUMENTS

JP    H8-117747 A    5/1996
JP    2001-079574 A    3/2001
(Continued)

OTHER PUBLICATIONS

Search Report for EP 12 84 3927, mailed Jun. 8, 2015.
(Continued)

*Primary Examiner* — Tuan Vu
(74) *Attorney, Agent, or Firm* — Greenblum & Bernstein, P.L.C.

(57) ABSTRACT

A controller performs multiple regression analysis using an optimum chemical injection rate as a target variable and using one or more water quality indices of a raw water as explanatory variables and thereby derives a calculation formula for a basic chemical injection rate corresponding to the water quality indices. Next, the controller calculates the basic chemical injection rate corresponding to the water quality indices by substituting the measured values of the water quality indices of the raw water into the calculation formula. Then, the controller corrects the basic chemical injection rate based on a measured value of the water quality index of the treated water, thereby newly calculates a chemical injection rate, and outputs the newly calculated chemical injection rate as a control factor for a chemical (Continued)

injection pump while supplying the newly calculated chemical injection rate to calculation of the optimum chemical injection rate.

8 Claims, 9 Drawing Sheets

(51) Int. Cl.
    *C02F 1/00*       (2006.01)
    *C02F 1/28*       (2006.01)
    *C02F 1/44*       (2006.01)

(52) U.S. Cl.
    CPC ............... *C02F 1/283* (2013.01); *C02F 1/44* (2013.01); *C02F 2209/001* (2013.01); *C02F 2209/003* (2013.01); *C02F 2209/006* (2013.01); *C02F 2209/02* (2013.01); *C02F 2209/06* (2013.01); *C02F 2209/07* (2013.01); *C02F 2209/11* (2013.01)

(56) References Cited

U.S. PATENT DOCUMENTS

| | | | |
|---|---|---|---|
| 2002/0033364 A1* | 3/2002 | Hammonds | B01F 1/00 210/198.1 |
| 2007/0289740 A1* | 12/2007 | Thigpen | E21B 37/06 166/250.01 |
| 2008/0046127 A1 | 2/2008 | Piironen et al. | |
| 2010/0292844 A1* | 11/2010 | Wolf | C02F 9/00 700/271 |
| 2010/0327071 A1* | 12/2010 | Bassett | A01G 25/00 239/1 |
| 2011/0155255 A1* | 6/2011 | Ladron de Guevara | F17D 3/10 137/3 |
| 2012/0145630 A1* | 6/2012 | Ogiwara | B01D 61/022 210/638 |

FOREIGN PATENT DOCUMENTS

| | | |
|---|---|---|
| JP | 2002-126721 A | 5/2002 |
| JP | 2003-200175 | 7/2003 |
| JP | 2004-008901 | 1/2004 |
| JP | 2005-230629 A | 9/2005 |
| JP | 2005-329358 A | 12/2005 |
| JP | 2005-329359 A | 12/2005 |
| JP | 2010-012383 | 1/2010 |
| JP | 2011-11107 A | 1/2011 |
| JP | 2011-189285 | 9/2011 |
| JP | 2011-200841 A | 10/2011 |
| KR | 10-1998-0053273 | 9/1998 |
| KR | 2010-0115852 | 10/2010 |

OTHER PUBLICATIONS

Waterworks Design Guideline Revision Committee, "Waterworks Design Guidelines 2000", Japan Water Works Association, Mar. 31, 2000, p. 146-p. 154, with partial translation.
International Preliminary Report on patentability for International application No. PCT/JP2012/077473, mail date is May 8, 2014.
International search report for International application No. PCT/JP2012/077473, mail date is Jan. 8, 2013.

* cited by examiner

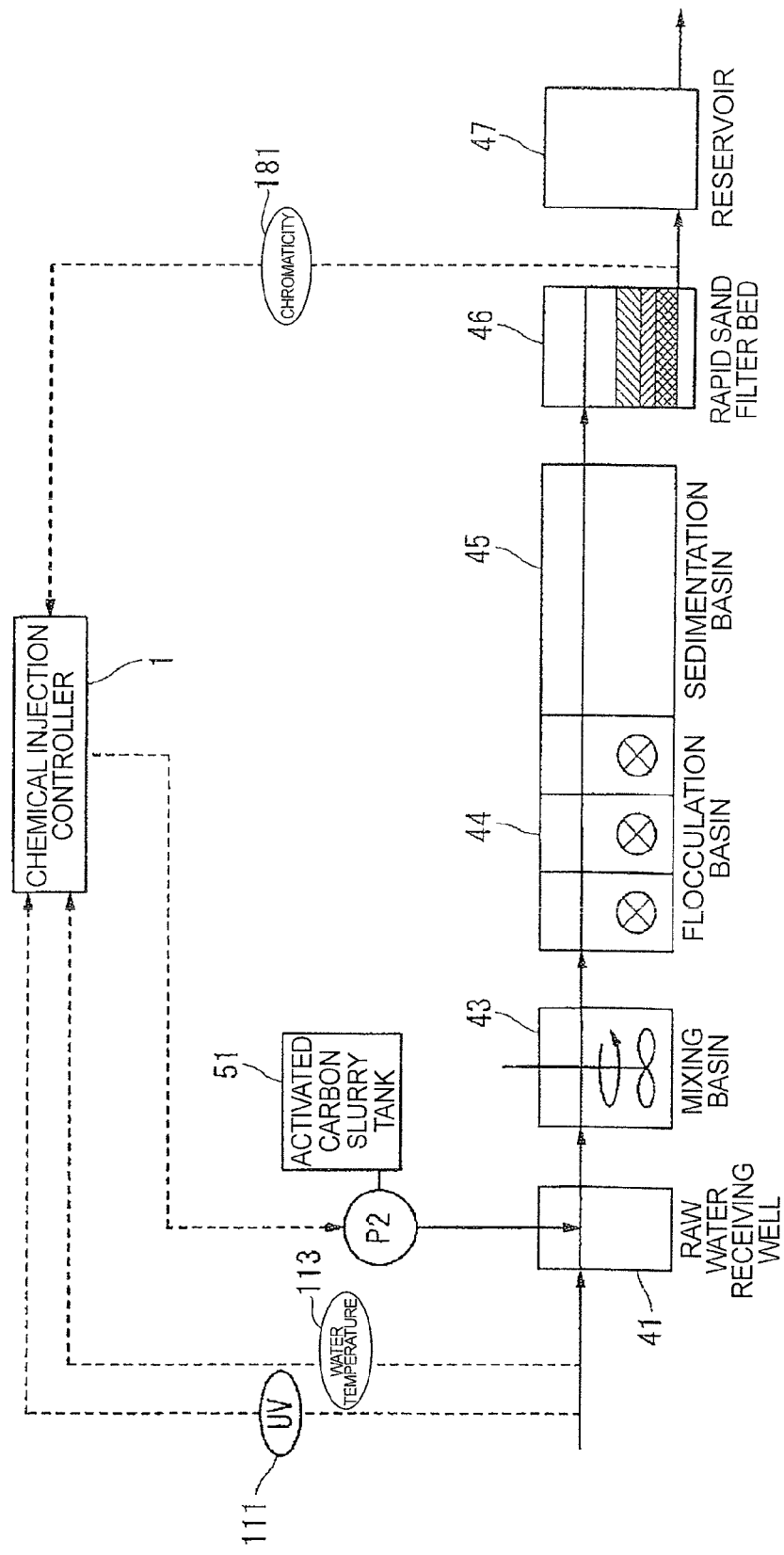

CHEMICAL INJECTION CONTROL METHOD AND CHEMICAL INJECTION CONTROLLER

TECHNICAL FIELD

The present invention relates to a chemical injection control method and controller therefor in a water purification system.

BACKGROUND ART

In order to be able to stably supply city water compliant with water quality standards, a water purification technique resulting from selecting and combining various methods is applied in water supply facilities, where the various methods are selected and combined by giving consideration to raw water quality, management goals for purified water quality, the scale of water purification facilities, operation control, the control level of maintenance and management techniques, and the like. For example, the selection is made from among a sterilization-only method, a slow filtration method, a rapid filtration method, and a membrane filtration method, and advanced water purification or the like is combined therewith (Non Patent Literature 1) as required.

Today, the rapid filtration method is adopted by approximately 75% (water volume ratio) of water services because of tolerance to high turbidity and more than a certain level of raw water contamination, because of no need for a vast area of land, because of effectiveness, and so forth.

A water purification plant which adopts the rapid filtration method includes a mixing basin generally injected with a flocculant and used to perform rapid stirring, a flocculation basin used to grow aggregates (flocs), a sedimentation basin used to sediment and remove the grown flocs, and a filter basin used to remove non-settled particles and flocs.

In water purification, chemicals such as powdered activated carbon and disinfectant (liquid chlorine or sodium hypochlorite) are used in addition to the flocculant (aluminum sulfate, polyaluminum chloride, polymeric flocculant, or iron flocculant). Also, in the water purification plant, proper chemical treatment is carried out while monitoring water quality conditions of raw water, purified water, and faucet water.

Then, if something unusual happens to the water quality of the raw water, measures are taken to more intensively inject water purification chemicals than under normal conditions. For example, when the concentration of a reducing material such as manganese, ammonium-nitrogen, or organic matter in the raw water increases, measures are taken to increase chlorine injection rate. Also, when increasing concentration of synthetic detergents or contamination with odor or phenols is sensed, powdered activated carbon treatment is usually carried out. In such a case, it is necessary to intensify chlorine treatment and coagulation sedimentation treatment in addition to injection of the powdered activated carbon.

An important point in water purification by the rapid filtration method is to form flocs which readily precipitate, by controlling the injection rate of the flocculant to an appropriate value according to the water quality of raw water. Flocculation treatment at an inappropriate injection rate will cause floc carryover from sedimentation basin or flocculation failure, resulting in problems such as increased head loss (filter resistance) of the filter basin, increased cleaning frequency, and leakage of very fine particles from the filter basin.

Also, activated carbon treatment for the purpose of removing soluble components such as organic matter or mold odor may adopt a combination of an activated carbon injection method and the membrane filtration method. Furthermore, treatment flows which incorporate treatment via injection of chemicals such as a flocculant are increasingly adopted because flocculation treatment is necessary depending on conditions such as a membrane type or permeation flux. With the membrane filtration method, a flocculant is added to the water to be filtered, to improve filterability and prevent clogging by increasing the size of very fine particles which could otherwise become fouling material.

A combination of feedforward control (hereinafter referred to as FF control) and feedback control (hereinafter referred to as FB control) is performed by a conventional chemical injection control method.

An appropriate flocculant injection rate varies depending on the source water quality, changing with the turbidity, alkalinity, pH, water temperature, and the like of raw water, and thus cannot be determined uniquely using raw water turbidity alone as an index. Therefore, conventionally the state of flocculation has been judged and the flocculant injection rate has been determined or controlled in water purification plants as follows.

Examples include a method which performs FF control based on an injection rate calculation formula which describes a relationship with appropriate flocculant injection rate using water quality such as the turbidity, pH, alkalinity, and water temperature of raw water as parameters. The calculation formula has been derived by an empirical method based on jar testing, supernatant turbidity in actual facilities, and/or the like. Examples of a developed version of this control system include a combination with FB control based on measured values of supernatant turbidity, and neuro/fuzzy logic AI control performed so as to approach results of jar testing conducted by an operator or operational performance of actual facilities.

Examples of background art documents which disclose FF control, FB control, or combinations thereof include Patent Literatures 1 to 3.

A chemical injection control method disclosed in Patent Literature 1 controls the injection rate of chemicals in real time based on the start time of agglomeration of particles in raw water.

A flocculant addition control method disclosed in Patent Literature 2 prevents excessive addition of flocculant by controlling the amount of flocculant addition based on the value of ultraviolet absorbance of a membrane filtrate produced by a membrane separation means.

A flocculant injection control method disclosed in Patent Literature 3 calculates optimal values of a flocculant injection rate, pre-alkali chemical injection rate, post-alkali chemical injection rate by multiple regression analysis and controls the amounts of injection of flocculant and alkali chemicals based on the injection rates.

On the other hand, in activated carbon injection control for the purpose of removing soluble components such as organic matter or mold odor, the injection rate of activated carbon is determined so as to obtain target water quality. However, it takes an awful lot of time to measure a trihalomethane precursor (hereinafter referred to as THMFP) or mold odor, and thus it is difficult to perform activated carbon injection control based on results of on-site measurements.

Thus, methods have been proposed which perform activated carbon injection control by predicting substances to be removed based on a statistical technique or by using alternative indices. For example, because the amount of THMFP production changes greatly with the water temperature and electrical conductivity of raw water, a method has been proposed which determines the injection rate of activated carbon corresponding to the amount of production by predicting substances to be removed based on a statistical technique (Patent Literature 4).

However, the conventional control techniques have the following problems.

When time variation in the water quality of raw water increases, a time delay occurs in FB control, making it difficult to follow a chemical injection rate sufficiently. Thus, it is important how to set the chemical injection rate appropriately in response to fluctuations in the water quality of raw water.

Also, in actual chemical injection control, even if there are fluctuations in the water quality of raw water, operation is run based on the chemical injection rate by providing a leeway in the amount of chemical injection so as to meet target treated-water quality even if there are fluctuations in the water quality of raw water. Moreover, when there are fluctuations in raw water quality, it is necessary to meet the target water quality by further increasing the degree of leeway. However, such a chemical injection control method involves injecting a more than necessary amount of chemicals, resulting in increased chemical costs. Especially when there are fluctuations in raw water quality, the impact of this becomes noticeable.

CITATION LIST

Non Patent Literature

Non Patent Literature 1: Waterworks Design Guideline Revision Committee, "Waterworks Design Guidelines 2000," published by Japan Water Works Association, Mar. 31, 2000, pp. 146-154

Patent Literature

Patent Literature 1: Japanese Patent Laid-Open Publication No. 2011-11107
Patent Literature 2: Japanese Patent Laid-Open Publication No. Hei-8-117747
Patent Literature 3: Japanese Patent Laid-Open Publication No. 2005-329359
Patent Literature 4: Japanese Patent Laid-Open Publication No. 2005-230629

SUMMARY OF INVENTION

Thus, the present invention provides a chemical injection control method for controlling a rate of chemical injection into raw water based on water qualities of the raw water and treated water in a water purification system, the method comprising: a process for calculating an optimum chemical injection rate by correcting a preset chemical injection rate based on a deviation of a measured value of a water quality index of the treated water from a target value of the water quality index, the measured value of the water quality index being obtained by operating a chemical injection pump based on the preset chemical injection rate; a process for performing multiple regression analysis using the optimum chemical injection rate as a target variable and using one or more water quality indices of the raw water as explanatory variables, determining partial regression coefficients of the respective explanatory variables, and thereby deriving a calculation formula for a basic chemical injection rate corresponding to the water quality indices of the raw water; a process for calculating the basic chemical injection rate corresponding to the water quality indices of the raw water by substituting the measured values of the water quality indices of the raw water into the calculation formula; and a process for correcting the basic chemical injection rate based on a measured value of the water quality index of the treated water obtained through operation of the chemical injection pump based on the basic chemical injection rate, thereby newly calculating a chemical injection rate, and outputting the newly calculated chemical injection rate as a control factor for the chemical injection pump while supplying the newly calculated chemical injection rate for calculation of the optimum chemical injection rate.

Also, the present invention provides a chemical injection controller which controls a rate of chemical injection into raw water based on water qualities of the raw water and treated water in a water purification system, the controller comprising: optimum chemical injection rate calculation means for calculating an optimum chemical injection rate by correcting a preset chemical injection rate based on a deviation of a measured value of a water quality index of the treated water from a target value of the water quality index, the measured value of the water quality index being obtained by operating a chemical injection pump based on the preset chemical injection rate; multiple regression analysis calculation means for performing multiple regression analysis using the optimum chemical injection rate as a target variable and using one or more water quality indices of the raw water as explanatory variables, determining partial regression coefficients of the respective explanatory variables, and thereby deriving a calculation formula for a basic chemical injection rate corresponding to the water quality indices of the raw water; basic chemical injection rate calculation means for calculating the basic chemical injection rate corresponding to the water quality indices of the raw water by substituting the measured values of the water quality indices of the raw water into the calculation formula; and chemical injection rate calculation means for correcting the basic chemical injection rate based on a measured value of the water quality index of the treated water obtained through control of the chemical injection pump based on the basic chemical injection rate, thereby newly calculating a chemical injection rate, and outputting the newly calculated chemical injection rate as a control factor for the chemical injection pump while supplying the newly calculated chemical injection rate to the optimum chemical injection rate calculation means.

BRIEF DESCRIPTION OF DRAWINGS

FIG. 9 is a configuration diagram of a water purification system according to an fourth embodiment of the present invention.

DESCRIPTION OF EMBODIMENTS

Summary

Figure 1:
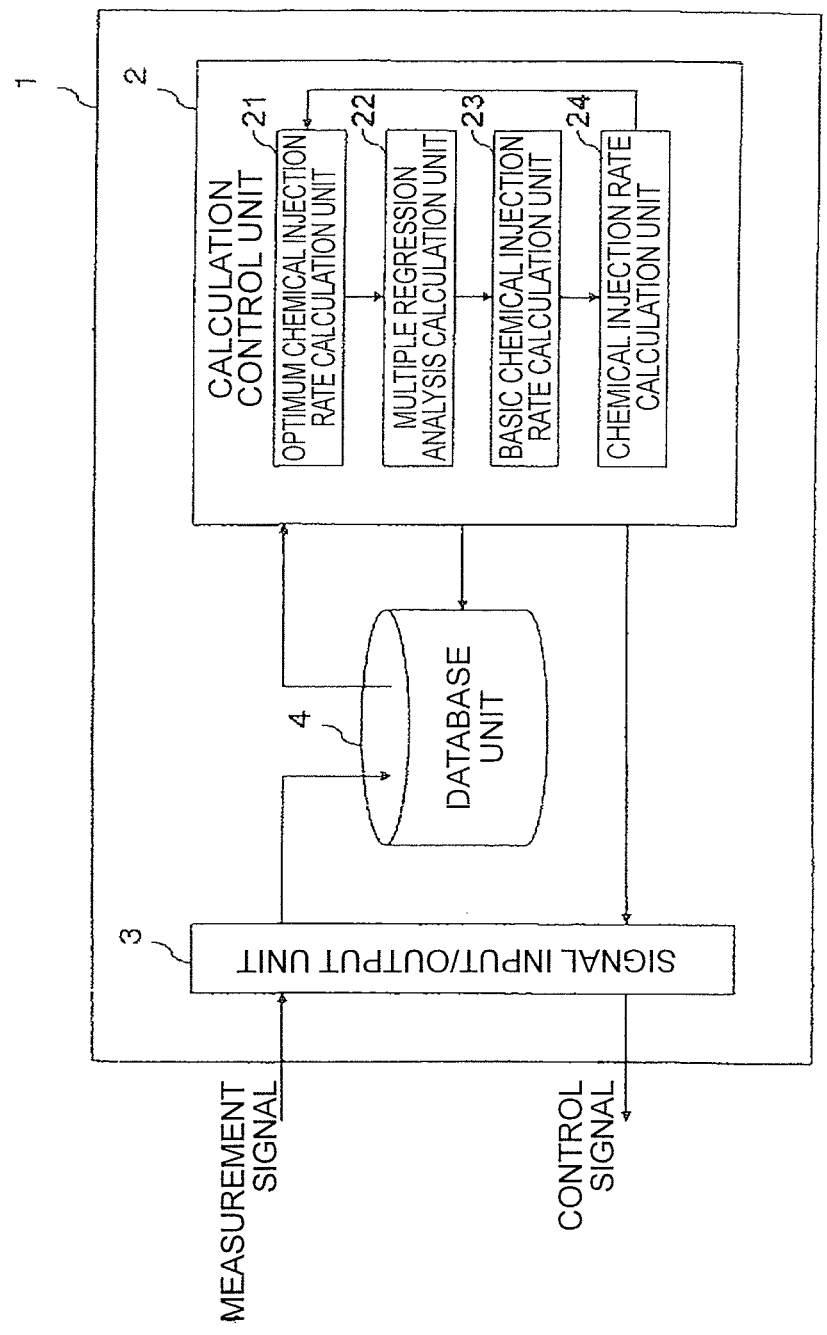
FIG. 1 is a schematic configuration diagram of a chemical injection controller according to an embodiment of the present invention.

Based on measurement signals concerning water quality indices of raw water and treated water in a water purification system, a chemical injection controller 1 according to an embodiment of the invention shown in FIG. 1 calculates a chemical injection rate with respect to the raw water and thereby outputs the calculated chemical injection rate as a control factor for a chemical injection pump.

Specifically, first, the chemical injection controller 1 calculates an optimum chemical injection rate by correcting a preset chemical injection rate based on a deviation of a measured value of a water quality index of the treated water from a target value of the water quality index, the measured value of the water quality index being obtained by operating the chemical injection pump based on the preset chemical injection rate.

Next, the chemical injection controller 1 performs multiple regression analysis using the optimum chemical injection rate as a target variable and using one or more water quality indices of the raw water as explanatory variables, determines partial regression coefficients of the respective explanatory variables, and thereby derives a calculation formula for a basic chemical injection rate corresponding to the water quality indices of the raw water.

Next, the chemical injection controller 1 calculates the basic chemical injection rate corresponding to the water quality indices of the raw water by substituting the measured values of the water quality indices of the raw water into the calculation formula.

Next, the chemical injection controller 1 corrects the basic chemical injection rate based on a measured value of the water quality index of the treated water obtained through operation of the chemical injection pump based on the basic chemical injection rate, and thereby newly calculates a chemical injection rate. Next, the chemical injection controller 1 outputs the newly calculated chemical injection rate as a control factor for the chemical injection pump while supplying the newly calculated chemical injection rate for calculation of the optimum chemical injection rate. The control factor is supplied to the water purification system, as a control signal for the chemical injection pump.

The above processes are performed repeatedly, and the optimum chemical injection rate and the water quality indices of the raw water are added to multiple regression analysis data of the past. Also, the multiple regression analysis based on the above-mentioned data is performed periodically, and calculation formula of the basic chemical injection rate used to achieve target treated-water quality is constantly updated. This enables chemical injection rate control operation which curbs a more than necessary amount of chemical injection and makes it possible to set an appropriate chemical injection rate in response to fluctuations in raw water quality.

The water quality of raw water varies with the water intake point and times even if the water is taken from the same river, and fluctuates noticeably during times of rainfall, flood, drought, and thaw, in particular. Therefore, regarding water quality indices, known water quality indices are selected appropriately according to water quality characteristics of raw water supplied to each water purification facility.

As the water quality indices of raw water and treated water, plural water quality indices are selected appropriately, for example, from among water temperature, turbidity, UV absorbance, chromaticity, pH value, alkalinity, potassium permanganate consumption, and TOC (total organic carbon) according to properties of the raw water.

Preferably UV absorbance, chromaticity, turbidity, and water temperature are selected as the water quality indices of the raw water while chromaticity, or turbidity and chromaticity are preferably selected as the water quality indices of the treated water.

Furthermore, measurement points of the water quality indices of raw water and treated water are selected appropriately from locations suitable for grasping the water quality characteristics of the raw water and treated water at the water purification facilities.

[Configuration of Apparatus]

The chemical injection controller 1 includes an calculation control unit 2, a signal input/output unit 3, and a database unit 4.

The calculation control unit 2 in turn includes an optimum chemical injection rate calculation unit 21, a multiple regression analysis calculation unit 22, a basic chemical injection rate calculation unit 23, and a chemical injection rate calculation unit 24.

The optimum chemical injection rate calculation unit 21 calculates an optimum chemical injection rate by correcting a preset chemical injection rate based on a deviation of a measured value of a water quality index of the treated water from a target value of the water quality index, the measured value of the water quality index being obtained by operating a chemical injection pump based on the preset chemical injection rate.

The multiple regression analysis calculation unit 22 performs multiple regression analysis using the optimum chemical injection rate as a target variable and using one or more water quality indices of the raw water as explanatory variables, determines partial regression coefficients of the respective explanatory variables of multiple regression equation, and thereby derives a calculation formula for a basic chemical injection rate corresponding to the water quality indices of the raw water.

The basic chemical injection rate calculation unit 23 calculates the basic chemical injection rate corresponding to the water quality indices of the raw water by substituting the measured values of the water quality indices of the raw water into the calculation formula. If the water quality of raw water is substitutable in team of measurement accuracy, measurement frequency, and the like, preferably measured values from a water quality measurement instrument are used. If a data update cycle is shortened using the measured values from the water quality measuring instrument, a larger volume of data can be collected in case of water quality fluctuations, enabling more accurate multiple regression analysis.

The chemical injection rate calculation unit 24 corrects the basic chemical injection rate based on a measured value of the water quality index of treated water obtained through control of the chemical injection pump based on the basic chemical injection rate, thereby newly calculating a chemical injection rate. Then, the chemical injection rate calculation unit 24 outputs the newly calculated chemical injection rate as a control signal (control factor) for the chemical injection pump while supplying the newly calculated chemical injection rate to the optimum chemical injection rate calculation means 21.

The signal input/output unit 3 accepts input of the measurement signals concerning the water quality indices of raw water and treated water from a water quality measurement device of the water purification system. Also, values of the basic chemical injection rate and chemical injection rate supplied from the calculation control unit 2 is output as a control signal for the chemical injection pump.

The database unit 4 saves measured values of the water quality indices of raw water and treated water supplied from the signal input/output unit 3. Also, the database unit 4 saves the optimum chemical injection rate calculated by calculation control unit 2 by associating the optimum chemical injection rate with the measurement signals of the water quality indices. Furthermore, the database unit 4 saves the calculation formula of the calculated basic flocculant injection rate as well as various set values. The chemical injection rate, water quality data, and the like accumulated in the database unit 4 can be deleted within the bounds of not hindering the control of the chemical injection rate, for example after a lapse of a predetermined time.

[Process of Chemical Injection Control]

Figure 2:
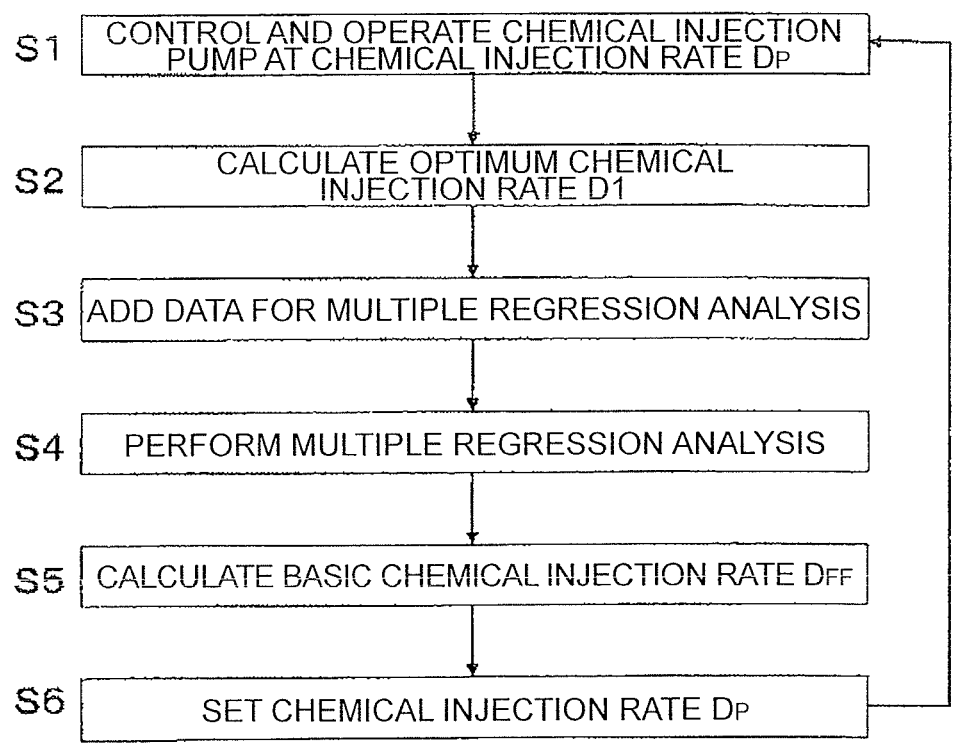
FIG. 2 is a flow chart showing procedures for chemical injection control according to the present invention.

A process of chemical injection control will be described with reference to a flow shown in FIG. 2.

S1: The chemical injection rate calculation unit 24 sets a chemical injection rate $D_P$ by means of FF control based on the water quality of raw water and by means of FB control based on the water quality of treated water. The chemical injection rate $D_P$ is output as a control signal for the chemical injection pump of the water purification system from the signal input/output unit 3. The chemical injection pump injects chemicals into the raw water at the chemical injection rate $D_P$.

The chemical injection rate $D_P$ is calculated by applying a chemical injection rate correction $D_{FB}$ to a basic chemical injection rate $D_{FF}$ calculated by substituting a water quality index value of raw water measured by a water quality measurement device for raw water into a basic chemical injection rate calculation formula established in advance (established in S4), where the chemical injection rate correction $D_{FB}$ is based on a water quality index value of treated water subsequently measured by a water quality measurement device for treated water. Incidentally, if the basic chemical injection rate $D_{FF}$ has not be calculated during chemical injection control due to a missing measurement value or the like of a raw water quality measuring instrument, an estimated value and manual analysis value can be substituted for the missing value.

The chemical injection rate $D_P$ can be given by the following expression.

Chemical injection rate $D_P$=basic chemical injection rate $D_{FF}$ (FF control based on the water quality of raw water)+chemical injection rate correction $D_{FB}$ (FB control based on the water quality of treated water)

The chemical injection rate correction $D_{FB}$ is a correction value for the injection rate and is used to correct the value of the chemical injection rate $D_P$ such that the value of the treated-water quality measured by a treated-water quality measuring instrument of the water purification system will be equal to or smaller than the value of the target treated-water quality. In the chemical injection controller 1, the chemical injection rate correction $D_{FB}$ may be synchronized with data update of the basic chemical injection rate $D_{FF}$, but a deviation between actual treated-water quality and target treated-water quality can be kept small if FB control based on the treated-water quality is performed in shorter cycles than the data update of the basic chemical injection rate $D_{FF}$. Also, this enables control highly responsive to water quality fluctuations of treated water resulting from water quality fluctuations of raw water. In the chemical injection controller 1, settings (values) related to the chemical injection rate correction $D_{FB}$ are kept at pre-update settings (values) until updated.

S2: The optimum chemical injection rate calculation unit 21 calculates the optimum chemical injection rate D1 by subtracting an excess injection rate ΔD1 of the chemicals corresponding to the deviation between the water quality of treated water obtained as a result of control in S1 and the target water quality of the treated water from the chemical injection rate $D_P$.

The optimum chemical injection rate D1 is calculated by subtracting that part of the injection rate which will become an excess in satisfying the target treated-water quality from the deviation between the treated-water quality measured by the treated-water quality measuring instrument of the water purification system at the chemical injection rate $D_P$ and the target treated-water quality.

The optimum chemical injection rate D1 is obtained by subtracting the excess injection ΔD1 from the chemical injection rate $D_P$ as given by the following expression.

$$D1=D_P-\Delta D1$$

where ΔD1 takes a negative value when the chemical injection rate $D_P$ is deficient.

S3: The value of the calculated optimum chemical injection rate D1 is added together with the then current water quality value of raw water to a population of the optimum chemical injection rates D1 and water qualities of the raw water stored in the database unit 4.

S4: The multiple regression analysis calculation unit 22 retrieves the population from the database unit 4, performs multiple regression analysis using the optimum chemical injection rate D1 as a target variable and using water quality indices of the raw water as explanatory variables, and determines partial regression coefficients of the respective explanatory variables of a multiple regression equation. The multiple regression equation thus derived is established as a basic chemical injection rate calculation formula corresponding to the water quality indices of the raw water.

S5: The basic chemical injection rate calculation unit 23 calculates the basic chemical injection rate $D_{FF}$ corresponding to the water quality indices of the raw water by substituting the values of the water quality indices of raw water measured by the water quality measurement device for raw water into the calculation formula of the basic chemical injection rate $D_{FF}$ derived in S4 (FF control). The basic chemical injection rate $D_{FF}$ is output as a control signal for the chemical injection pump from the signal input/output unit 3. The chemical injection pump injects chemicals into the raw water at the basic chemical injection rate $D_{FF}$.

S6: The chemical injection rate calculation unit 24 corrects the basic chemical injection rate $D_{FF}$ based on the measured values of the water quality indices of treated water obtained through operation of the chemical injection pump based on the chemical injection rate $D_{FF}$ calculated in S5, and thereby newly calculates a chemical injection rate $D_P$ (FB control). Then, the chemical injection rate calculation unit 24 outputs the chemical injection rate $D_P$ as a control factor for the chemical injection pump via the signal input/output unit 3 while supplying the chemical injection rate $D_P$ to the process of S1.

The basic chemical injection rate $D_{FF}$ described above is updated on a predetermined cycle set in advance. The optimum chemical injection rate D1 and the measured values from the raw water quality measuring instrument (or water analysis results) used in the update process are saved in the database unit 4 on a predetermined cycle. The predetermined cycle is set arbitrarily. Manual or automatic changes are enabled to allow the intended treated-water quality to be achieved, for example, according to magnitude of time variation in the water quality of raw water, and the predetermined cycle is shortened with increases in the magnitude of time variation in the water quality of raw water.

Also, in the process of deriving the calculation formula of the basic chemical injection rate $D_{FF}$ in S4, advisably a value range of each water quality index of raw water is divided into plural sub-ranges and the above-described multiple regression analysis is performed for each of the sub-ranges to derive a calculation formula for each sub-range. This will make it possible to obtain an accurate calculation formula of the basic chemical injection rate $D_{FF}$ for each sub-range of the water quality index.

in the process of calculating the basic chemical injection rate $D_{FF}$ in S5, advisably the basic chemical injection rate $D_{FF}$ corresponding to the water quality index of the raw water is calculated through a calculation based on the calculation formula for the value range of the water quality index to which the measured value of the water quality index of the raw water belongs. This makes it possible to obtain a more accurate basic chemical injection rate $D_{FF}$ corresponding to the water quality of raw water.

Also, when plural types of chemicals are used, at the point when a calculated value of the basic chemical injection rate $D_{FF}$ of one chemical exceeds a threshold, advisably the chemical injection rate corresponding to the threshold is output as a control factor for the chemical injection pump for the chemical and the flow moves to an injection control process for another chemical in procedures S2 to S6 and S1.

Then, at the point when the basic chemical injection rate of the one chemical falls to or below the threshold, advisably the flow moves from the injection control process for the other chemical to the injection control process in procedures S2 to S6 and S1 for the one chemical. This makes it possible to prevent excessive injection of the other chemical.

A more specific exemplary embodiment of the chemical injection controller 1 according to the present invention will be described below. Note that the present invention is not limited to this embodiment, and may be implemented in various modified forms within the scope of the claims.

First Embodiment

Figure 3:
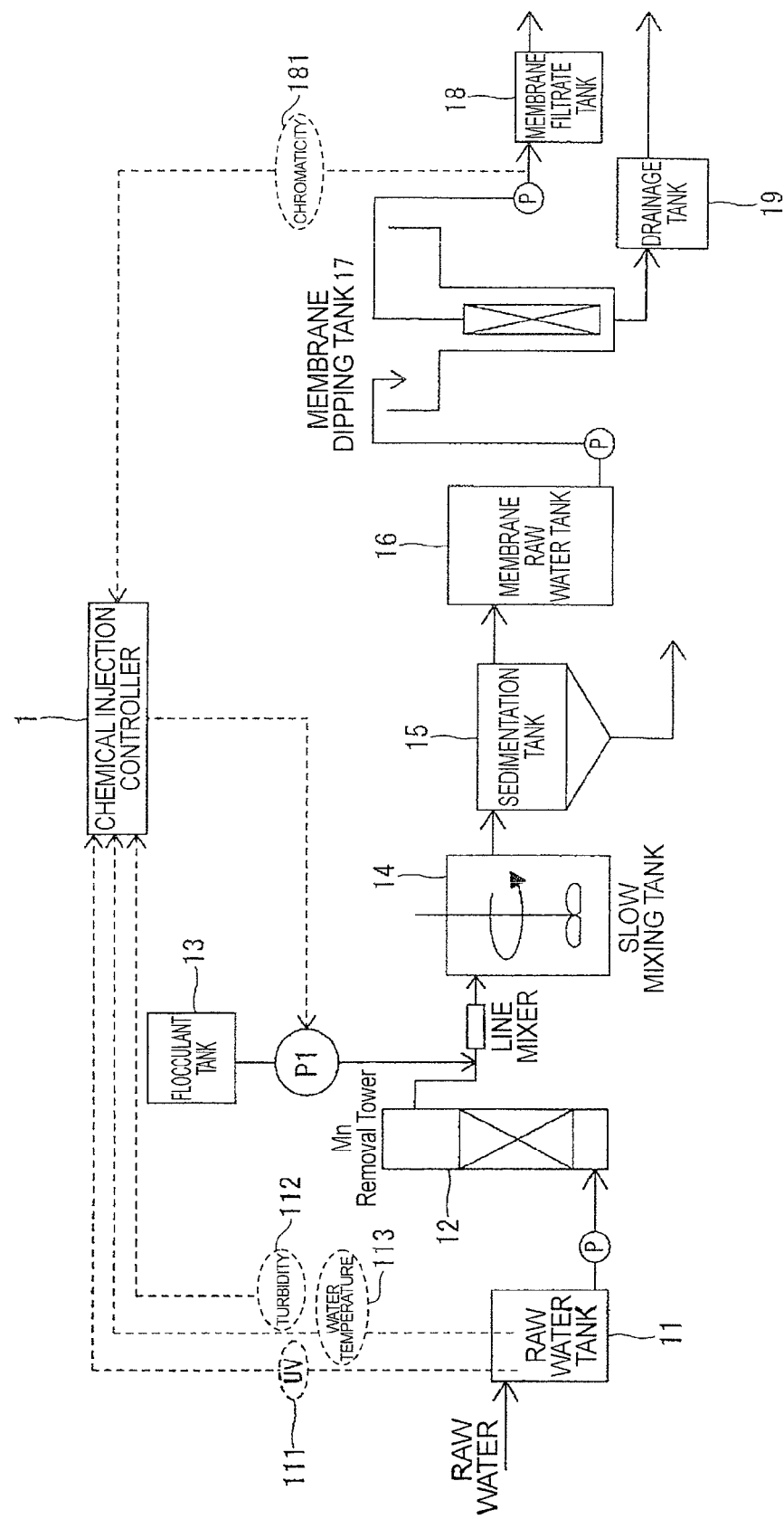
FIG. 3 is a configuration diagram of a water purification system according to an first embodiment of the present invention.

The water purification system according to the present embodiment illustrated in FIG. 3 by way of example uses the chemical injection controller 1 as flocculant injection control means in the water purification system which is based on a membrane filtration method.

With the membrane filtration method, as long as there is no membrane rupture, treated water with a logarithmic turbidity removal rate of 5 to 7 log is available, and thus, the turbidity of the treated water does not present a problem. Therefore, chromaticity has been adopted as a water quality index of a membrane filtrate (treated water). At the water purification plant based on the method according to the present embodiment, the chromaticity of raw water affects the flocculant injection rate more greatly than does turbidity of raw water. Furthermore, the water temperature of raw water is considered to affect composition (molecular weight) of the chromaticity via biological activity, indirectly affecting the flocculant injection rate. Thus, regarding parameters of the explanatory variables for multiple regression analysis, turbidity and UV absorbance are selected as basic parameters while water temperature is selected as an auxiliary parameter.

There are two method for measuring chromaticity: colorimetric method which uses comparison with standard lines of color standard solutions, and an absorptiometric method which uses a wavelength of 390 nm. The absorptiometric method measures turbidity at the same time using another wavelength (660 nm) sensitive only to suspended matter and compensates for turbidity.

Also, since organic pollutants existing in water absorbs ultraviolet rays, the UV absorbance is normally used to determine concentration of organic pollutants in measured water by measuring absorbance at a wavelength of 254 nm.

Figure 4:
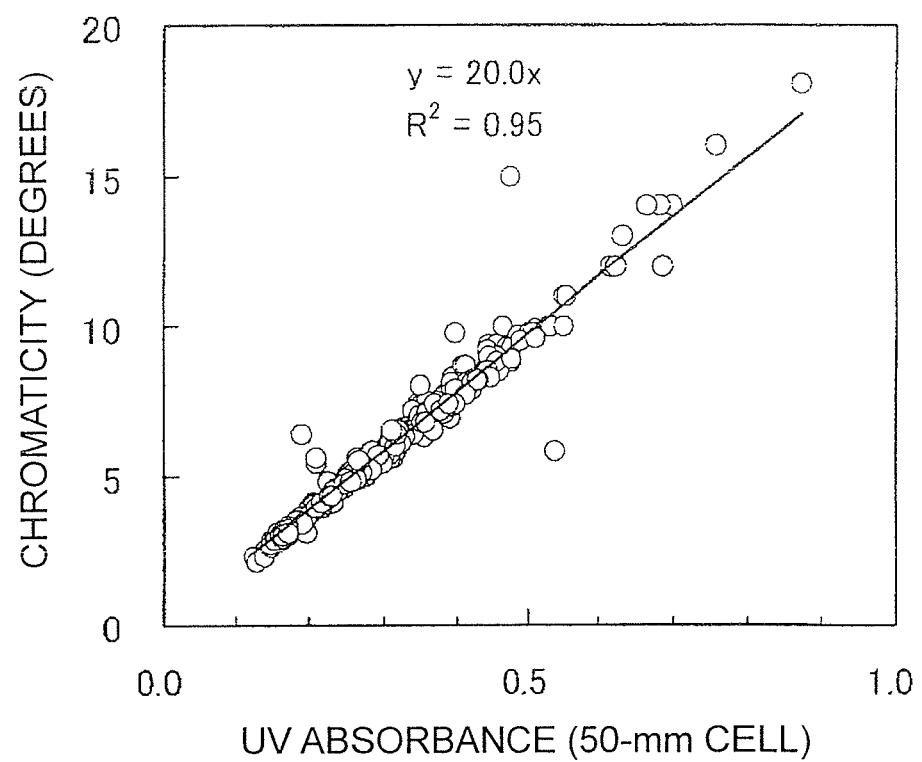
FIG. 4 is graph showing a relationship between UV absorbance and chromaticity

In the present embodiment, chromaticity has been substituted with UV absorbance, and a relationship which has served as a basis for the substitution, i.e., a relationship of UV absorbance values with chromaticity values measured by the absorptiometric method measured in a test conducted in a water treatment system provided with a membrane filtration process, is shown in FIG. 4. Since there is a high correlation between chromaticity and UV absorbance as illustrated in FIG. 4, UV absorbance can be adopted as an index alternative to chromaticity.

Furthermore, the reason why UV absorbance is adopted as an index alternative to chromaticity is that generally there are many cases in which UV absorbance is adopted as an index of organic matter in the raw water in a water purification plant.

In applying the chemical injection controller 1 to a water purification plant, if a chromoscope has been installed, making it possible to measure the chromaticity of raw water, the chromoscope can be adopted.

(Effectiveness of Optimum Chemical Injection Rate D1)

The water purification system according to the present embodiment was operated at a flocculant injection rate $Dg_p{'}$ given by an injection rate calculation formula based on the water quality of raw water according to a conventional method, and a surplus and deficiency of the injection rate were calculated as a condition for satisfying an intended treated-water quality from a resulting deviation between actual treated-water quality and target treated-water quality. Then, based on the surplus and deficiency, an optimum flocculant injection rate Dg1' according to the conventional flocculant injection rate control method was calculated. The optimum flocculant injection rate Dg1' was obtained by correcting a PAC flocculant injection rate such that chromaticity of the membrane filtrate would be less than 1.0 degrees at the flocculant injection rate $Dg_p{'}$.

Figure 5:
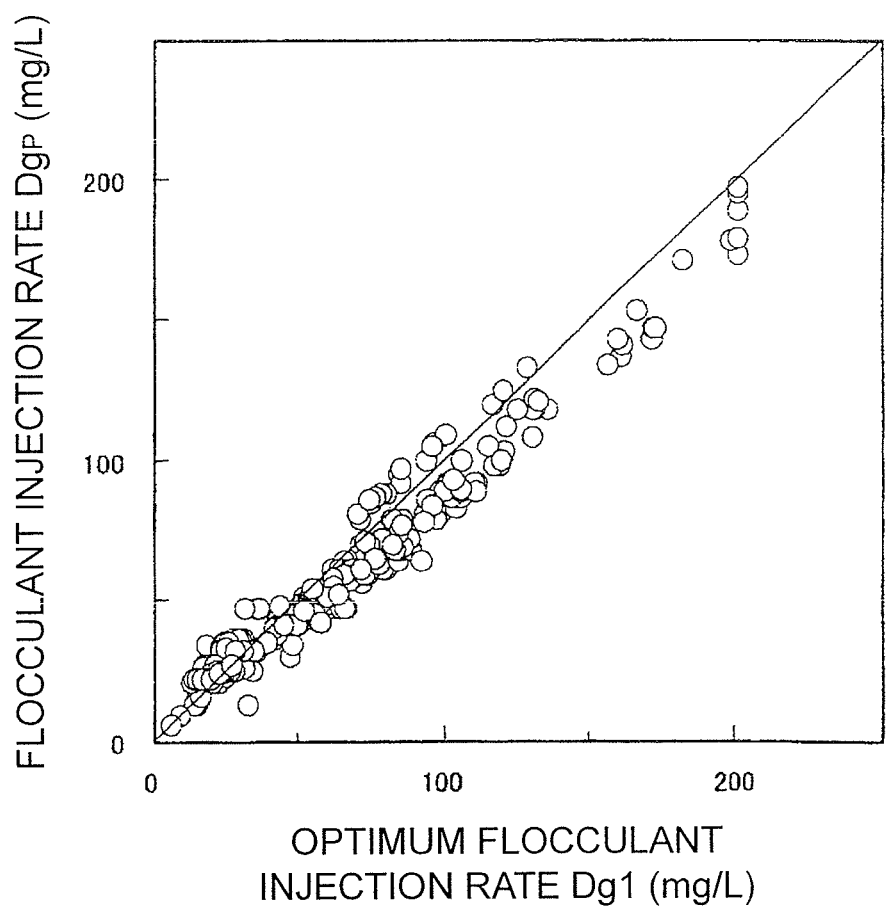
FIG. 5 is graph showing a relationship between an optimum flocculant injection rate and flocculant injection rate.

In relation to a flocculant injection test conducted at a membrane treatment experiment plant, a relationship between the optimum flocculant injection rate Dg1' and the flocculant injection rate $Dg_p{'}$ at the membrane treatment experiment plant is shown in FIG. 5. Regarding timing to collect data on the flocculant injection rate $Dg_p{'}$, the data was collected once a day at a fixed time (water analysis time was 9:30) generally on a 24-hour cycle.

A region below a relationship line with a slope of 1 shown in FIG. 5 is a data region in which a negative correction was applied to the flocculant injection rate $Dg_p'$ compared to the optimum flocculant injection rate $Dg1'$. Most of the data is plotted in this data region, indicating that the flocculant injection rate $Dgp'$ set in the experiment plant was generally lower than the optimum flocculant injection rate $Dg1'$ and that the amount of flocculant injection tended to be deficient.

As a result, in a flocculant injection control test by the conventional method in which the plant was operated at the flocculant injection rate $Dg_p'$ under FF control based on the water quality of raw water, in many cases the condition for target treated-water quality, i.e., a chromaticity of the membrane filtrate of less than 1.0 degrees, was not satisfied.

It can be seen from the foregoing that excess and deficiency of the chemical injection rate at an actual plant can be evaluated precisely by calculating the optimum chemical injection rate D1. Thus, by changing the chemical injection rate to accommodate water quality changes of raw water and treated water, it is possible to calculate the optimum chemical injection rate on a predetermined cycle from the results of chemical injection control, update the chemical injection rate according to the water quality of raw water based on the calculation results, and thereby implement chemical injection control which curbs the amount of chemical injection.

(Configuration of Water Purification System According to First Embodiment)

As shown in FIG. 3, the water purification system according to the present embodiment has the chemical injection controller 1 attached to equipment which includes a raw water tank 11, a Mn removal tower 12, a flocculant tank 13, a slow mixing tank 14, a sedimentation tank 15, a membrane raw water tank 16, a membrane dipping tank 17, a membrane filtration tank 18, and a drainage tank 19. The raw water tank 11 includes a UV absorption spectrometer 111, a turbidimeter 112, and a water temperature gage 113. The flocculant tank 13 stores a flocculant. Examples of the flocculant includes PAC (polyaluminum chloride), aluminum sulfate, polymeric flocculant, and iron flocculant. Also, the flocculant tank 13 includes a flocculant injection pump P1 adapted to inject a flocculant into the treated water which is supplied from the Mn removal tower 12 to the slow mixing tank 14 after undergoing Mn removal. The flocculant injection pump P1 operates based on a control signal supplied from the chemical injection controller 1. The membrane dipping tank 17 includes a membrane separation unit adapted to apply a solid-liquid separation process to a supernatant water which is supplied from the membrane raw water tank 16. The membrane filtration tank 18 includes a chromoscope 181 adapted to measure the chromaticity of the treated water supplied from the membrane dipping tank 17.

The UV absorption spectrometer 111, turbidimeter 112, water temperature gage 113, and chromoscope 181 have adopted a well-known measurement system. The UV absorption spectrometer 111 adopts a method of measuring UV absorbance in a 10-mm cell, for example, after the raw water is sand-filtered. The turbidimeter 112 adopts, for example, a surface scattering method. The water temperature gage 113 adopts, for example, a method which uses a resistance temperature detector.

The chemical injection controller 1 according to the present embodiment accepts as input respective measurement signals from the UV absorption spectrometer 111, turbidimeter 112, water temperature gage 113, and chromoscope 181 and outputs a control signal for the flocculant injection pump P1.

(Chemical Injection Control Procedures According to First Embodiment)

The chemical injection controller 1 according to the present embodiment performs chemical injection control according to the procedures shown above in FIG. 2.

S1: The chemical injection rate calculation unit 24 substitutes the UV absorbance, turbidity, and water temperature values of raw water measured by the UV absorption spectrometer 111, turbidimeter 112, and water temperature gage 113, into a basic flocculant injection rate calculation formula (calculation formula (1) described later) established in advance and thereby calculates a basic flocculant injection rate $Dg_{FF}$ (FF control). Operation of the flocculant injection pump P1 is controlled based on the basic flocculant injection rate $Dg_{FF}$. Subsequently, the basic flocculant injection rate $Dg_{FF}$ is corrected to be a flocculant injection rate $Dg_P$ so as to eliminate any deviation between the chromaticity value of treated water measured by the chromoscope 181 and the target chromaticity value of the treated water set in advance within the calculation control unit 2 (FB control). The flocculant injection rate $Dg_P$ is output as a control signal for the flocculant injection pump P1 from the signal input/output unit 3. The flocculant injection pump P1 injects the flocculant at the flocculant injection rate $Dg_p$ into the raw water to be supplied to the slow mixing tank 14.

S2: The optimum chemical injection rate calculation unit 21 calculates the optimum flocculant injection rate Dg1 by subtracting an excess injection rate $\Delta D1$ of the flocculant corresponding to the deviation between the chromaticity value of treated water (value measured by the chromoscope 181) obtained as a result of control in S1 and the target chromaticity value of the treated water from the flocculant injection rate $Dg_P$.

S3: The value of the calculated optimum flocculant injection rate Dg1 is added together with the then current values of the water quality indices (UV absorbance, turbidity, and water temperature) of raw water to a population of the optimum flocculant injection rates Dg1 and water quality indices of the raw water in the database unit 4.

S4: The multiple regression analysis calculation unit 22 retrieves the population from the database unit 4, performs multiple regression analysis using the optimum flocculant injection rate Dg1 as a target variable and using the UV absorbance, turbidity, and water temperature of the raw water as explanatory variables, and determines partial regression coefficients ($\alpha$, $\beta$, $\gamma$) of the respective explanatory variables and a constant term ($\delta$), of a multiple regression equation. The multiple regression equation thus derived is established as a basic flocculant injection rate calculation formula used to calculate the basic flocculant injection rate $Dg_{FF}$ corresponding to the UV absorbance, turbidity, and water temperature of the raw water. The calculation formula is shown below.

Basic flocculant injection rate $Dg_{FF}$ (mg/l)=$\alpha \times$UV absorbance of raw water (-)+$\beta \times$turbidity of raw water (degrees)+$\gamma \times$water temperature of raw water)(C.°)+$\delta$     (1)

S5: The basic chemical injection rate calculation unit 23 calculates the basic flocculant injection rate $Dg_{FF}$ corresponding to the water quality indices of the raw water by substituting the UV absorbance, turbidity, and water temperature values of the raw water measured by the UV absorption spectrometer 111, turbidimeter 112, and water temperature gage 113 into calculation formula (1) (FF control). The basic flocculant injection rate $Dg_{FF}$ is output as a control signal for the flocculant injection pump P1 from the signal input/output unit 3. The flocculant injection pump P1 injects the flocculant at the basic flocculant injection rate $Dg_{FF}$ into the raw water to be supplied to the slow mixing tank 14.

S6: The chemical injection rate calculation unit 24 corrects the basic flocculant injection rate $Dg_{FF}$ based on the measured value of a water quality index (chromaticity) of treated water obtained through operation of the flocculant injection pump P1 based on the injection rate $Dg_{FF}$ calculated in S5, and thereby newly calculates a flocculant injection rate $Dg_P$ (FB control). Specifically, a new flocculant injection rate $Dg_P$ is calculated by correcting the basic flocculant injection rate $Dg_{FF}$ so as to eliminate any deviation between the chromaticity value of treated water measured by the chromoscope 181 and the target chromaticity value of the treated water set in advance within the calculation control unit 2. Then, the chemical injection rate calculation unit 24 outputs the flocculant injection rate $Dg_P$ as a control signal for the flocculant injection pump P1 via the signal input/output unit 3 while supplying the flocculant injection rate $Dg_P$ to the process of S1.

Thus, the basic flocculant injection rate $Dg_{FF}$ is calculated through calculations based on calculation formula (1), and various data (the value of the optimum flocculant injection rate Dg1 and the then current values of water quality indices (UV absorbance, turbidity, and water temperature) of raw water) for multiple regression analysis are collected and accumulated sequentially in the database unit 4. Also, calculation formula (1) is updated using the accumulated data, improving calculation accuracy of the basic flocculant injection rate $Dg_{FF}$ and thereby implementing reliable flocculant injection control. Furthermore, the basic flocculant injection rate $Dg_{FF}$ is corrected by FB control, making it possible to follow fluctuations in the water quality of raw water.

EXAMPLE

Figure 6:
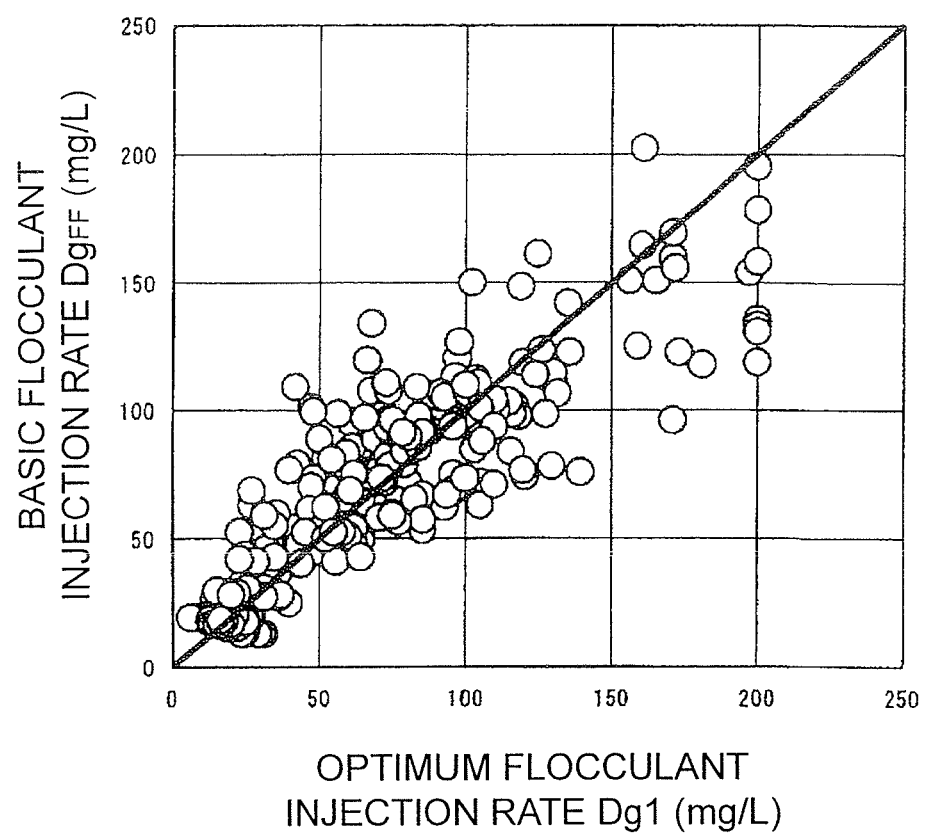
FIG. 6 is graph showing a relationship between the optimum flocculant injection rate and basic flocculant injection rate.

As an example of the first embodiment, evaluations were made based on approximately one year of flocculant injection testing conducted at a membrane treatment experiment plant equivalent to the water purification system of FIG. 3 using the raw water of a water purification plant. Polyaluminum chloride was used as the flocculant. In the present example, data was collected generally on a 24-hour cycle, i.e., once a day, at a fixed time (water analysis time was 9:30). A graph comparing the optimum flocculant injection rate Dg1 calculated in the present example with the basic flocculant injection rate $Dg_{FF}$ is shown in FIG. 6. As illustrated, data plots are located near the line y=x, and a correlation was observed between the optimum flocculant injection rate Dg1 and basic flocculant injection rate $Dg_{FF}$. Also, regarding error portions, the basic flocculant injection rate $Dg_{FF}$ is corrected (FB control) in S6 and S1 and various data for multiple regression analysis are accumulated sequentially in the database unit 4, allowing calculation accuracy to be improved using the data.

Although in the example described above, calculations and evaluations were carried out based on water quality measurement data taken once a day, calculations may be performed on a fixed cycle, or when changes in the water quality of raw water exceeds the value of variation width per predetermined time, or when changes in the water quality of the membrane filtrate exceeds the value of variation width per predetermined time.

Also, if ranges of measured values of UV absorbance, turbidity, and water temperature which are explanatory variables in a multiple regression analysis carried out using the optimum flocculant injection rate Dg1 as an objective variable are each divided into sub-ranges according to situations by taking factors of seasonal variations and the like into consideration, the reliability of flocculant injection control can be further improved even in case of the seasonal variations or the like.

Furthermore, if calculation frequency is changed according to the time rate of change of water quality, flocculant injection control can follow any sudden fluctuation in the water quality of raw water.

Note that although polyaluminum chloride was used in the example described above, similar results will be available even if aluminum sulfate, polymeric flocculant, or iron flocculant is used.

Second Embodiment

Figure 7:
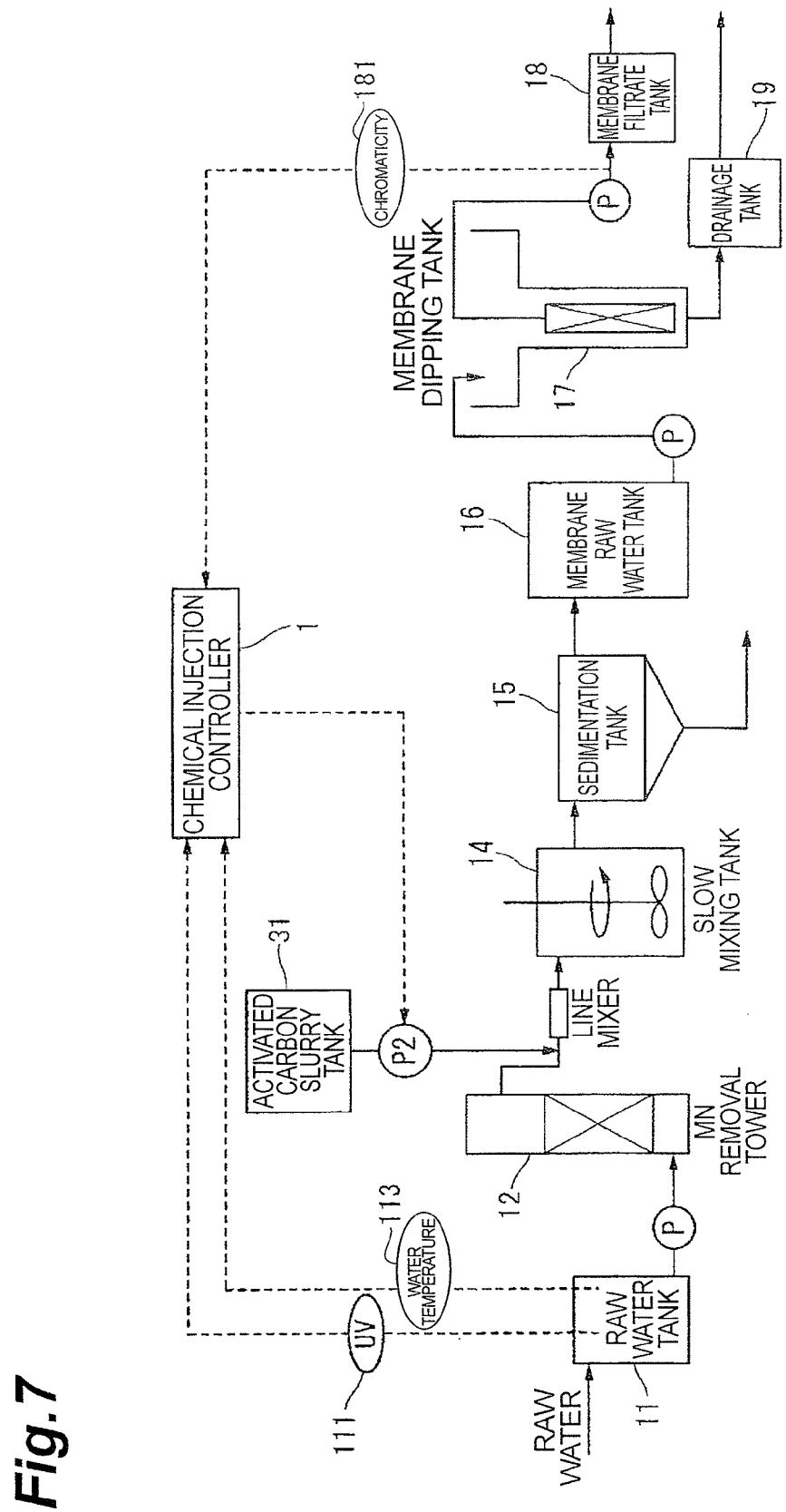
FIG. 7 is a configuration diagram of a water purification system according to a second embodiment of the present invention.

A water purification system according to a second embodiment illustrated in FIG. 7 by way of example uses the chemical injection controller 1 as powdered-activated-carbon injection control means in a water purification system which is based on a membrane filtration method.

The water purification system according to the present embodiment has the same configuration as the water purification system according to the first embodiment except that the present embodiment is not equipped with the turbidimeter 112 and is equipped with an activated carbon slurry tank 31 instead of the flocculant tank 13. The activated carbon slurry tank 31 includes a slurry injection pump P2 adapted to inject activated carbon slurry into the treated water which is supplied from the Mn removal tower 12 to the slow mixing tank 14 after undergoing Mn removal. The slurry injection pump P2 operates based on a control signal supplied from the chemical injection controller 1.

In activated carbon injection control, since an object treated with the activated carbon is the dissolved organic matter to be removed, turbidity cannot be used as an explanatory variable, and thus chromaticity and water temperature are used as explanatory variables in performing multiple regression analysis using an optimum activated carbon injection rate as an objective variable. Note that the illustrated water purification system according to the present embodiment uses UV absorbance instead of the chromaticity of raw water based on the characteristic shown in FIG. 4.

Chemical injection control procedures according to the present embodiment will be described with reference to FIGS. 2 and 7.

S1: The chemical injection rate calculation unit 24 substitutes the UV absorbance and water temperature of raw water measured by the UV absorption spectrometer 111 and water temperature gage 113 into a basic activated carbon injection rate calculation formula (calculation formula (2) described later) established in advance and thereby calculates a basic activated carbon injection rate $Dk_{FF}$ (FF control). Operation of the slurry injection pump P2 is controlled based on the basic activated carbon injection rate $Dk_{FF}$. Next, the basic activated carbon injection rate $Dk_{FF}$ is corrected to be an activated carbon injection rate $Dk_P$ so as to eliminate any deviation between the chromaticity value of treated water measured by the chromoscope 181 and the target chromaticity value of the treated water set in advance within the calculation control unit 2 (FB control). The activated carbon injection rate $Dk_P$ is output as a control signal for the slurry injection pump P2 from the signal input/output unit 3. The slurry injection pump P2 injects the activated carbon slurry at the activated carbon injection rate $Dk_P$ into the raw water to be supplied to the slow mixing tank 14.

S2: The optimum chemical injection rate calculation unit 21 calculates an optimum activated carbon injection rate Dk1 by subtracting an excess injection rate ΔD1 of the activated carbon slurry corresponding to the deviation between a chromaticity value (measured value produced by the chromoscope 181) of treated water obtained as a result of control in S1 and a target chromaticity value of the treated water from the activated carbon injection rate $Dk_P$.

S3: The value of the calculated optimum activated carbon injection rate Dk1 is added together with the then current values of the water quality indices (UV absorbance and water temperature) of raw water to a population of the optimum activated carbon injection rates Dk1 and water quality indices of the raw water in the database unit 4.

S4: The multiple regression analysis calculation unit 22 retrieves the population from the database unit 4, performs multiple regression analysis using the optimum activated carbon injection rate Dk1 as a target variable and using the UV absorbance and water temperature of the raw water as explanatory variables, and determines partial regression coefficients (α', β') of the respective explanatory variables and a constant term (γ'), of a multiple regression equation. The multiple regression equation thus derived is established as a basic activated carbon injection rate calculation formula used to calculate the basic activated carbon injection rate $Dk_{FF}$ corresponding to the UV absorbance and water temperature of the raw water.

Basic activated carbon injection rate $Dk_{FF}$ (mg/l)=
α'×UV absorbance of raw water (−)+β'×water
temperature of raw water (C.°)+γ'     (2)

S5: The basic chemical injection rate calculation unit 23 calculates the basic activated carbon injection rate $Dk_{FF}$ corresponding to the water quality indices of the raw water by substituting the values of the water quality indices (UV absorbance and water temperature) of the raw water measured by the UV absorption spectrometer 111 and water temperature gage 113 into calculation formula (2) (FF control). The basic activated carbon injection rate $Dk_{FF}$ is output as a control signal for the slurry injection pump P2 from the signal input/output unit 3. The slurry injection pump P2 injects the activated carbon slurry at the basic activated carbon injection rate $Dk_{FF}$ into the raw water to be supplied to the slow mixing tank 14.

S6: The chemical injection rate calculation unit 24 corrects the basic activated carbon injection rate $Dk_{FF}$ based on the measured value of a water quality index (chromaticity) of treated water obtained through operation of the slurry pump P2 at the injection rate $Dk_{FF}$ calculated in S5, and thereby newly calculates an activated carbon injection rate $Dk_P$ (FB control). Specifically, a new activated carbon injection rate $Dk_P$ is calculated by correcting the basic activated carbon injection rate $Dk_{FF}$ so as to eliminate any deviation between the chromaticity value of treated water measured by the chromoscope 181 and the target chromaticity value of the treated water set in advance within the calculation control unit 2. Then, the chemical injection rate calculation unit 24 outputs the activated carbon injection rate $Dk_P$ as a control signal for the slurry injection pump P2 via the signal input/output unit 3 while supplying the activated carbon injection rate $Dk_P$ to the process of S1.

Thus, the basic activated carbon injection rate $Dk_{FF}$ is calculated through calculations based on calculation formula (2) and various data (the value of the optimum activated carbon injection rate Dk1 and the then current values of water quality indices (UV absorbance and water temperature) of raw water) for multiple regression analysis are collected and accumulated sequentially in the database unit 4. Also, calculation formula (2) is updated using the accumulated data, improving calculation accuracy of the basic activated carbon injection rate $Dk_{FF}$ and thereby implementing reliable activated carbon injection control. Furthermore, the basic activated carbon injection rate $Dk_{FF}$ is corrected by FB control, making it possible to follow fluctuations in the water quality of raw water.

Again in the second embodiment, if an activated carbon injection rate control test is conducted according to the above procedures, it is estimated that there is a correlation between the optimum activated carbon injection rates Dk1 and basic activated carbon injection rate $Dk_{FF}$, with some error portions provided, as with the first embodiment. Regarding the error portions, the basic activated carbon injection rate $Dk_{FF}$ is corrected (FB control) and various data for multiple regression analysis are accumulated sequentially in the database unit 4, allowing calculation accuracy to be improved using the data.

Third Embodiment

Figure 8:
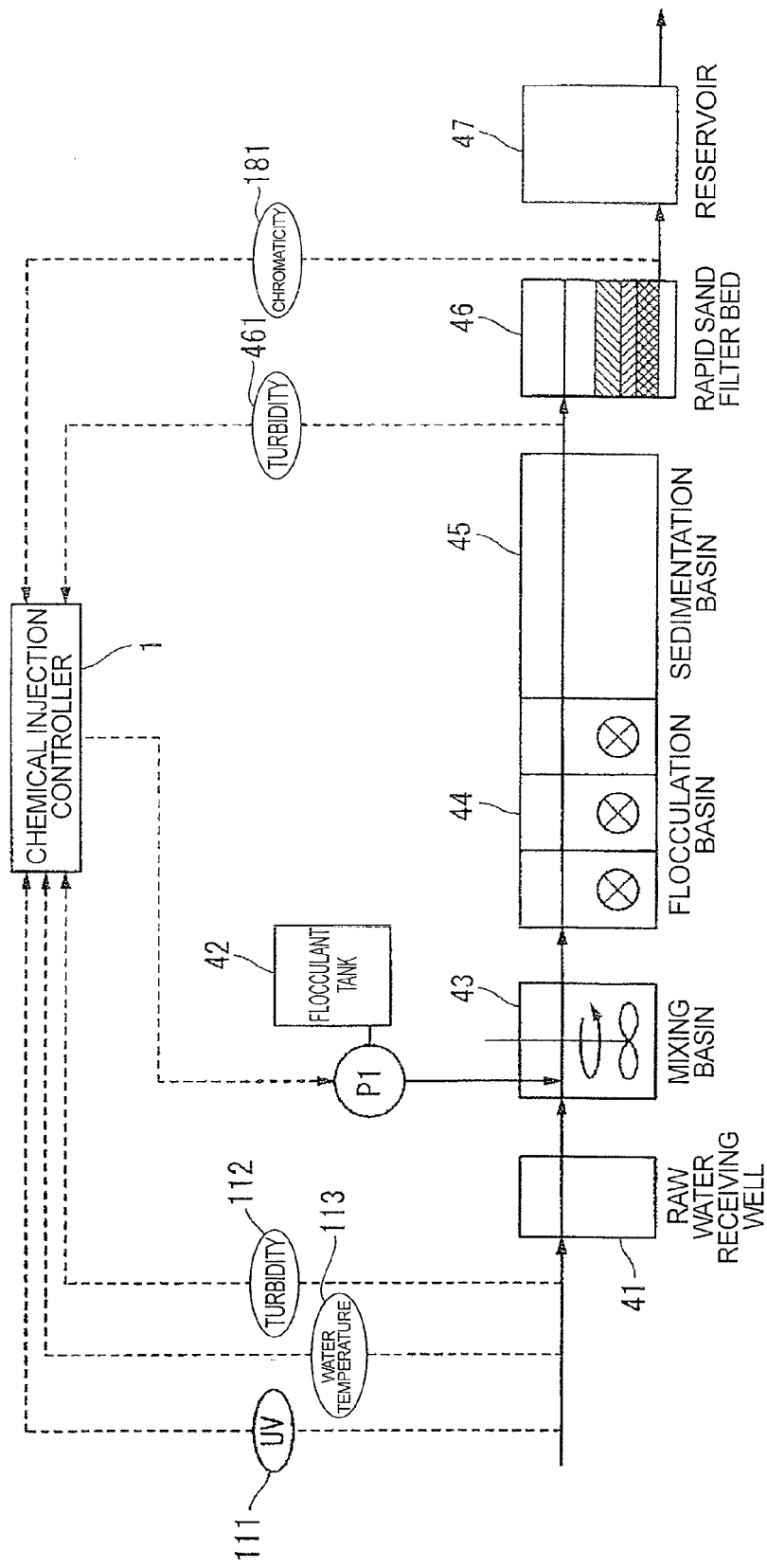
FIG. 8 is a configuration diagram of a water purification system according to an third embodiment of the present invention.

A water purification system according to a third embodiment illustrated in FIG. 8 by way of example uses the chemical injection controller 1 as flocculant injection control means in a water purification system which is based on a rapid filtration method.

The water purification system according to the present embodiment has the chemical injection controller 1 attached to equipment which includes a raw water receiving well 41, a flocculant tank 42, a mixing basin 43, a flocculation basin 44, a sedimentation basin 45, rapid sand filter bed 46, and a pure water reservoir 47. The raw water receiving well 41 includes a UV absorption a spectrometer 111, a turbidimeter 112, and a water temperature gage 113. The flocculant tank 42 stores a flocculant. The flocculant is selected appropriately from polyaluminum chloride (PAC), aluminum sulfate, polymeric flocculant, iron flocculant, and the like according to the properties of raw water as with the first embodiment. The flocculant tank 42 includes a flocculant injection pump P1 adapted to inject a flocculant into the raw water in the mixing basin 43. The rapid sand filter bed 46 includes a turbidimeter 461 adapted to measure the turbidity of supernatant water supplied from the sedimentation basin 45. Also, the rapid sand filter bed 46 includes a chromoscope 181 adapted to measure the chromaticity of the treated water discharged from the filter bed 46. The turbidimeter 461 has the same specifications as the turbidimeter 112 according to the first embodiment.

The chemical injection controller 1 according to the present embodiment accepts as input respective measurement signals from the UV absorption spectrometer 111, turbidimeters 112 and 461, water temperature gage 113, and chromoscope 181 and outputs a control signal for the flocculant injection pump P1.

Chemical injection control procedures according to the present embodiment will be described with reference to FIGS. 2 and 8.

S1: The chemical injection rate calculation unit 24 substitutes the UV absorbance, turbidity, and water temperature values of raw water measured by the UV absorption spectrometer 111, turbidimeter 112, and water temperature gage 113, into a basic flocculant injection rate calculation formula (calculation formula (3) described later) established in advance and thereby calculates a basic flocculant injection rate $Dg_{FF}$ (FF control). Operation of the flocculant injection pump P1 is controlled based on the basic flocculant injection rate $Dg_{FF}$. Next, the basic flocculant injection rate $Dg_{FF}$ is corrected to be a flocculant injection rate $Dg_P$ so as to eliminate any deviations of the turbidity value of supernatant water measured by the turbidimeter 461 and chromaticity value of filtered water measured by the chromoscope 181 from the target turbidity value of the supernatant water and target chromaticity value of the filtered water set in advance within the calculation control unit 2 (FB control). The flocculant injection rate $Dg_P$ is output as a control signal for the flocculant injection pump P1 from the signal input/output unit 3. The flocculant injection pump P1 injects the flocculant at the flocculant injection rate $Dg_p$ into the raw water in the mixing basin 43. Incidentally, the treated water's target turbidity value established beforehand and held by the calculation control unit 2 is set, for example, to 0.5 degrees because it is necessary in the rapid filtration method to keep the turbidity of supernatant water to about 0.5 degrees or below.

S2: The optimum chemical injection rate calculation unit 21 calculates an optimum flocculant injection rate Dg1 by subtracting an excess injection rate ΔD1 of the flocculant corresponding to the deviation of the turbidity value (measured value produced by the turbidimeter 461) of the supernatant water and chromaticity value (measured value produced by and chromoscope 181 of the filtered water obtained as a result of control in S1 from the target turbidity value of the supernatant water and target chromaticity value of the filtered water from the flocculant injection rate $Dg_p$.

S3: The value of the calculated optimum flocculant injection rate Dg1 is added together with the then current values of the water quality indices (UV absorbance, turbidity, and water temperature) of raw water to a population of the optimum flocculant injection rates Dg1 and water quality indices of the raw water in the database unit 4.

S4: The multiple regression analysis calculation unit 22 retrieves the population from the database unit 4, performs multiple regression analysis using the optimum flocculant injection rate Dg1 as a target variable and using the UV absorbance, turbidity, and water temperature of the raw water as explanatory variables, and determines partial regression coefficients (α1, β1, γ1) of the respective explanatory variables and a constant term (δ), of a multiple regression equation. The multiple regression equation thus derived is established as a basic flocculant injection rate calculation formula used to calculate the basic flocculant injection rate $Dg_{FF}$ corresponding to the UV absorbance, turbidity, and water temperature of the raw water. The calculation formula is shown below.

Basic flocculant injection rate $Dg_{FF}$ (mg/l)=α1×UV absorbance of raw water (−)+β1×turbidity of raw water (degrees)+γ1×water temperature of raw water (C.°)+δ (3)

S5: The basic chemical injection rate calculation unit 23 calculates the basic flocculant injection rate $Dg_{FF}$ corresponding to the water quality indices of the raw water by substituting the values of the water quality indices (UV absorbance, turbidity, and water temperature) of the raw water measured by the UV absorption spectrometer 111, turbidimeter 112, and water temperature gage 113 into calculation formula (3) (FF control). The basic flocculant injection rate $Dg_{FF}$ is output as a control signal for the flocculant injection pump P1 from the signal input/output unit 3. The flocculant injection pump P1 injects the flocculant at the basic flocculant injection rate $Dg_{FF}$ into the raw water in the mixing basin 43.

S6: The chemical injection rate calculation unit 24 corrects the basic flocculant injection rate $Dg_{FF}$ based on the measured values of a water quality index (turbidity) of the supernatant water and water quality index (chromaticity) of the filtered water obtained through operation of the flocculant injection pump P1 based on the injection rate $Dg_{FF}$ calculated in S5, thereby newly calculating a flocculant injection rate $Dg_P$ (FB control). Specifically, a new flocculant injection rate $Dg_P$ is calculated by correcting the basic flocculant injection rate $Dg_{FF}$ so as to eliminate any deviations of the turbidity value of supernatant water measured by the turbidimeter 461 and chromaticity value of filtered water measured by the chromoscope 181 from the target turbidity value of the supernatant water and target chromaticity value of the filtered water set in advance within the calculation control unit 2. Then, the chemical injection rate calculation unit 24 outputs the flocculant injection rate $Dg_P$ as a control signal for the flocculant injection pump P1 via the signal input/output unit 3 while supplying the flocculant injection rate $Dg_P$ to the process of S1.

Thus, the basic flocculant injection rate $Dg_{FF}$ is calculated through calculations based on calculation formula (3) and various data (the value of the optimum flocculant injection rate Dg1 and the then current values of water quality indices (UV absorbance, turbidity, and water temperature) of raw water) for multiple regression analysis are collected and accumulated sequentially in the database unit 4. Also, calculation formula (3) is updated using the accumulated data, improving calculation accuracy of the basic flocculant injection rate $Dg_{FF}$ and thereby implementing reliable flocculant injection control. Furthermore, the basic flocculant injection rate $Dg_{FF}$ is corrected by FB control, making it possible to follow fluctuations in the water quality of raw water.

Again in the third embodiment, if an flocculant injection rate control test is conducted according to the above procedures, it is estimated that there is a correlation between the optimum flocculant injection rate Dg1 and basic flocculant injection rate $Dg_{FF}$, with some error portions provided, as with the first embodiment. Regarding error portions, the basic flocculant injection rate $Dg_{FF}$ is corrected (FB control) and various data for multiple regression analysis are accumulated sequentially in the database unit 4, allowing calculation accuracy to be improved using the data.

Fourth Embodiment

A water purification system according to a fourth embodiment illustrated in FIG. 9 by way of example uses the chemical injection controller 1 as powdered-activated-carbon injection control means in a water purification system which is based on a rapid filtration method.

The water purification system according to the present embodiment has the same configuration as the water purification system according to the third embodiment except that the present embodiment is not equipped with the turbidimeters 112 and 461, is equipped with an activated carbon slurry tank 51 instead of the flocculant tank 42, and is adopted to inject activated carbon slurry into the raw water in the raw water receiving well 41 instead of the mixing basin 43. The activated carbon slurry tank 51 includes a slurry injection pump P2 adapted to inject activated carbon slurry into raw water in the raw water receiving well 41. The slurry injection pump P2 operates based on a control signal supplied from the chemical injection controller 1.

Chemical injection control procedures according to the present embodiment will be described with reference to FIGS. 2 and 9.

S1: The chemical injection rate calculation unit 24 substitutes the UV absorbance and water temperature of raw water measured by the UV absorption spectrometer 111 and water temperature gage 113 into a basic activated carbon injection rate calculation formula (calculation formula (4) described later) established in advance and thereby calculates a basic activated carbon injection rate $Dk_{FF}$ (FF control). Operation of the slurry injection pump P2 is controlled based on the basic activated carbon injection rate $Dk_{FF}$. Next, the basic activated carbon injection rate $Dk_{FF}$ is corrected to be an activated carbon injection rate $Dk_P$ so as to eliminate any deviation between the chromaticity value of filtered water measured by the chromoscope 181 and the target chromaticity value of the filtered water set in advance within the calculation control unit 2 (FB control). The activated carbon injection rate $Dk_P$ is output as a control signal for the slurry injection pump P2 from the signal input/output unit 3. The slurry injection pump P2 injects the activated carbon slurry into the raw water in the raw water receiving well 41 at the activated carbon injection rate $Dk_P$.

S2: The optimum chemical injection rate calculation unit 21 calculates an optimum activated carbon injection rate Dk1 by subtracting an excess injection rate ΔD1 of the activated carbon slurry corresponding to the deviation between the chromaticity value (measured value produced by the chromoscope 181) of filtered water obtained as a result of control in S1 and the target chromaticity value of the filtered water from the activated carbon injection rate $Dk_P$.

S3: The value of the calculated optimum activated carbon injection rate Dk1 is added together with the current values of the water quality indices (UV absorbance and water temperature) of raw water to a population of the optimum activated carbon injection rates Dk1 and water quality indices of the raw water in the database unit 4.

S4: The multiple regression analysis calculation unit 22 retrieves the population from the database unit 4, performs multiple regression analysis using the optimum activated carbon injection rate Dk1 as a target variable and using the UV absorbance and water temperature of the raw water as explanatory variables, and determines partial regression coefficients (α1', β1') of the respective explanatory variables and a constant term (γ1'), of a multiple regression equation. The multiple regression equation thus derived is established as a basic activated carbon injection rate calculation formula used to calculate the basic activated carbon injection rate $Dk_{FF}$ corresponding to the UV absorbance and water temperature of the raw water. The calculation formula is shown below.

Basic activated carbon injection rate $Dk_{FF}$ (mg/l)=
α1'×UV absorbance of raw water (−)+β1'×water
temperature of raw water (C.°)+γ1'  (4)

S5: The basic chemical injection rate calculation unit 23 calculates the basic activated carbon injection rate $Dk_{FF}$ corresponding to the water quality indices of the raw water by substituting the values of the water quality indices (UV absorbance and water temperature) of the raw water measured by the UV absorption spectrometer 111 and water temperature gage 113 into calculation formula (4) (FF control). The basic activated carbon injection rate $Dk_{FF}$ is output as a control signal for the slurry injection pump P2 from the signal input/output unit 3. The slurry injection pump P2 injects the activated carbon slurry at the basic activated carbon injection rate $Dk_{FF}$ into the raw water in the raw water receiving well 41.

S6: The chemical injection rate calculation unit 24 corrects the basic activated carbon injection rate $Dk_{FF}$ based on the measured value of a water quality index (chromaticity) of filtered water obtained through operation of the slurry injection pump P2 at the injection rate $Dk_{FF}$ calculated in S5, and thereby newly calculates an activated carbon injection rate $Dk_P$ (FB control). Specifically, a new activated carbon injection rate $Dk_P$ is calculated by correcting the basic activated carbon injection rate $Dk_{FF}$ so as to eliminate any deviation of the chromaticity value of filtered water measured by the chromoscope 181 from the target turbidity value of the supernatant water and target chromaticity value of the filtered water set in advance within the calculation control unit 2. Then, the chemical injection rate calculation unit 24 outputs the activated carbon injection rate $Dk_P$ as a control signal for the slurry injection pump P2 via the signal input/output unit 3 while supplying the activated carbon injection rate $Dk_P$ to the process of S1.

Thus, the basic activated carbon injection rate $Dk_{FF}$ is calculated through calculations based on calculation formula (4) and various data (the value of the optimum activated carbon injection rate Dk1 and the then current values of water quality indices (UV absorbance and water temperature) of raw water) for multiple regression analysis are collected and accumulated sequentially in the database unit 4. Also, calculation formula (4) is updated using the accumulated data, improving calculation accuracy of the basic activated carbon injection rate $Dk_{FF}$ and thereby implementing reliable activated carbon injection control. Furthermore, the basic activated carbon injection rate $Dk_{FF}$ is corrected by FB control, making it possible to follow fluctuations in the water quality of raw water.

Again in the fourth embodiment, if an activated carbon injection rate control test is conducted according to the above procedures, it is estimated that there is a correlation between the optimum activated carbon injection rates Dk1 and basic activated carbon rate $Dk_{FF}$, with some error portions provided, as with the first embodiment. Regarding error portions, the basic activated carbon injection rate $Dk_{FF}$ is corrected (FB control) and various data for multiple regression analysis are accumulated sequentially in the database unit 4, allowing calculation accuracy to be improved using the data.

Fifth Embodiment

The first to fourth embodiments described above are aspects of chemical injection control in which a flocculant or activated carbon slurry is used alone as a chemical, but the chemical injection control method according to the present invention is applicable to injection control for plural types of chemicals.

For example, the present invention is also applicable to a case in which chemical injection control is continued by changing a controlled chemical to another chemical at the time point when the injection rate of one chemical exceeds a predetermined value. A more specific example is a case in which in controlling the injection rate of PAC used as a flocculant for the purpose of removing dissolved organic matter such as chromaticity components, at the time point when the basic flocculant injection rate reaches or exceeds a predetermined level of flocculant injection rate, the chemical placed under chemical injection control is changed from PAC to another chemical such as activated carbon slurry with the PAC injection rate fixed.

In the water purification plant, there are cases in which a maximum flocculant injection rate is set to around 200 mg/l due to limits on installation capacity, due to leakage of aluminum, because of chemical costs in excess of a predetermined range, or the like. In this case, it is necessary to perform flocculant injection rate control and activated carbon injection control as chemical injection rate control.

Thus, the chemical injection controller 1 according to the present embodiment curbs excessive injection of flocculants through injection control of PAC and activated carbon slurry based on procedures (1) to (4) below. Description will be given here of exemplary control performed when the basic flocculant injection rate for PAC is at a threshold (200 mg/l) in a water purification system which combines the first and second embodiments. Procedures similar to those described below can be used also by a water purification system which combines the third and fourth embodiments.

(1) Control the operation of the PAC injection pump by repeating S1 to S6 of the first embodiment.

(2) In S5 of the first embodiment, compare the value of calculated basic flocculant injection rate $Dg_{FF}$ with the 200 mg/l threshold.

(3) If it is determined as a result of the comparison that the value of basic flocculant injection rate $Dg_{FF}$ exceeds the threshold, fix the value of the flocculant injection rate $Dg_P$ to the threshold, and operate the PAC injection pump based on this injection rate. At the same time, go to the processes of S2 to S6 of the second embodiment described above and control the operation of the activated-carbon slurry pump.

(4) Continue operating the PAC injection pump at the threshold of the flocculant injection rate and repeat the processes of S1 to S6 of the second embodiment. Calculate the basic activated carbon injection rate $Dk_{FF}$ in the process of S5 while calculating the basic flocculant injection rate $Dg_{FF}$ using the process of S5 of the first embodiment. Then, when the value of the basic flocculant injection rate $Dg_{FF}$ falls to or below the threshold, go to the processes of S2 to S6 or S1 to S6 of the first embodiment from S5 of the second embodiment.

The chemical injection control for a combination of plural types of chemicals in procedures (1) to (4) described above makes it possible to curb excessive injection of PAC and activated carbon slurry.

Although the present embodiment concerns injection control for a combination of PAC and activated carbon slurry, the injection control according to the present invention for plural types of chemicals is not limited to the present embodiment. For example, the present invention is applicable even when the type of chemical injected at the time point when the injection rate of one chemical exceeds a predetermined value is changed to another chemical, and various combinations are possible depending on various conditions including water purification property, chemical costs, and stockpiles of the chemicals used.

Also, as described earlier, raw water varies with the water intake point and times even if the water is supplied from the same river, and the water quality of raw water fluctuates noticeably during times of rainfall, flood, drought, thaw, and the like in particular. Therefore, water quality indices of raw water and treated water are not limited to the water quality indices mentioned in the first to fifth embodiments, and known water quality indices are selected appropriately according to water quality characteristics of raw water in each water purification facility.

Furthermore, the measurement points of the water quality indices of raw water and treated water are not limited to those mentioned in the first to fifth embodiments, and are selected appropriately from locations suitable for grasping water quality characteristics of the raw water and treated water at the water purification facilities.

REFERENCE SIGNS LIST

1 . . . Chemical injection controller
21 . . . Optimum chemical injection rate calculation unit (Optimum chemical injection rate calculation means)
22 . . . Multiple regression analysis calculation unit (Multiple regression analysis calculation means)
23 . . . Basic chemical injection rate calculation unit (Basic chemical injection rate calculation means)
24 . . . Chemical injection rate calculation unit (Chemical injection rate calculation means)

The invention claimed is:

1. A chemical injection control method for controlling a rate of chemical injection into raw water based on water qualities of the raw water and treated water in a water purification system, the method being implemented with a controller equipped with one or more hardware storage devices having stored thereon instructions implementing the controller processes, which when executed by the controller perform the method, comprising:

a process for calculating an optimum chemical injection rate by correcting a preset chemical injection rate based on a deviation of a measured value of a water quality index of the treated water from a target value of the water quality index, the measured value of the water quality index being obtained by operating a chemical injection pump based on the preset chemical injection rate;

a process for performing multiple regression analysis using the optimum chemical injection rate as a target variable and using one or more water quality indices of the raw water as explanatory variables, determining partial regression coefficients of the respective explanatory variables, and thereby deriving a calculation formula for a basic chemical injection rate corresponding to the water quality indices of the raw water;

a process for calculating the basic chemical injection rate corresponding to the water quality indices of the raw water by substituting the measured values of the water quality indices of the raw water into the calculation formula; and a process for correcting the basic chemical injection rate based on a measured value of the water quality index of the treated water obtained through operation of the chemical injection pump based on the basic chemical injection rate, thereby newly calculating a chemical injection rate, and outputting the newly calculated chemical injection rate as a control factor for the chemical injection pump while supplying the newly calculated chemical injection rate for calculation of the optimum chemical injection rate.

2. A chemical injection control method, wherein:

in injecting a plurality of types of chemicals into raw water based on water qualities of the raw water and treated water, when a calculated value of a basic chemical injection rate of one chemical exceeds a threshold, a chemical injection rate corresponding to the threshold is output as a control factor for a chemical injection pump for the chemical and a transition is made to a process for performing chemical injection control according to claim 1 for another chemical.

3. A chemical injection control method, wherein:

in injecting a plurality of types of chemicals into raw water based on water qualities of the raw water and treated water, when a calculated value of a basic chemical injection rate of one chemical exceeds a threshold, a chemical injection rate corresponding to the threshold is output as a control factor for a chemical injection pump for the chemical and a transition is made to a process for performing chemical injection control according to claim 1 for another chemical, and wherein when the calculated value of the basic chemical injection rate of the one chemical falls to or below the threshold, a transition is made from the process of chemical injection control for the other chemical to a process of chemical injection control according to claim 1 for the one chemical.

4. The chemical injection control method according to claim 1, wherein in the process for deriving the calculation formula, a value range of each water quality index of the raw water is divided into a plurality of sub-ranges and the multiple regression analysis is performed for each of the sub-ranges to derive a calculation formula for the each sub-range.

5. The chemical injection control method according to claim 4, wherein in the process for calculating the basic chemical injection rate, the basic chemical injection rate corresponding to the water quality index of the raw water is calculated through a calculation based on the calculation formula for the value range of the water quality index to which the measured value of the water quality index of the raw water belongs.

6. The chemical injection control method according to claim 1, wherein as the water quality indices of the raw water, a plurality of water quality indices are selected from among water temperature, turbidity, UV absorbance, chromaticity, pH value, alkalinity, potassium permanganate consumption, and total organic carbon.

7. The chemical injection control method according to claim 6, wherein as the water quality index of the treated water, one or more water quality indices are selected from among water temperature, turbidity, UV absorbance, chromaticity, pH value, alkalinity, potassium permanganate consumption, and total organic carbon.

8. A chemical injection controller which controls a rate of chemical injection into raw water based on water qualities of the raw water and treated water in a water purification system, the controller including one or more hardware storage devices having stored thereon executable instructions implementing the controller processing means, the means comprising:

optimum chemical injection rate calculation means for calculating an optimum chemical injection rate by correcting a preset chemical injection rate based on a deviation of a measured value of a water quality index of the treated water from a target value of the water quality index, the measured value of the water quality index being obtained by operating a chemical injection pump based on the preset chemical injection rate;

multiple regression analysis calculation means for performing multiple regression analysis using the optimum chemical injection rate as a target variable and using one or more water quality indices of the raw water as explanatory variables, determining partial regression coefficients of the respective explanatory variables, and thereby deriving a calculation formula for a basic chemical injection rate corresponding to the water quality indices of the raw water;

basic chemical injection rate calculation means for calculating the basic chemical injection rate corresponding to the water quality indices of the raw water by substituting the measured values of the water quality indices of the raw water into the calculation formula; and chemical injection rate calculation means for correcting the basic chemical injection rate based on a measured value of the water quality index of the treated water obtained through operation of the chemical injection pump based on the basic chemical injection rate, thereby newly calculating a chemical injection rate, and outputting the newly calculated chemical injection rate as a control factor for the chemical injection pump while supplying the newly calculated chemical injection rate to the optimum chemical injection rate calculation means.

* * * * *